United States Patent
Barsness et al.

(10) Patent No.: US 10,126,878 B2
(45) Date of Patent: *Nov. 13, 2018

(54) PRESSURE-SENSITIVE TOUCH SCREEN DISPLAY AND METHOD

(71) Applicant: International Business Machines Corporation, Armonk, NY (US)

(72) Inventors: Eric L. Barsness, Pine Island, MN (US); Jay S. Bryant, Rochester, MN (US); James E. Carey, Rochester, MN (US); Joseph W. Cropper, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,130

(22) Filed: Nov. 14, 2017

(65) Prior Publication Data

US 2018/0088738 A1 Mar. 29, 2018

Related U.S. Application Data

(63) Continuation of application No. 15/277,121, filed on Sep. 27, 2016, now Pat. No. 9,870,098.

(51) Int. Cl.
*G06F 3/041* (2006.01)
*G06F 3/0346* (2013.01)

(52) U.S. Cl.
CPC .......... *G06F 3/0418* (2013.01); *G06F 3/0346* (2013.01); *G06F 3/0412* (2013.01); *G06F 3/0414* (2013.01)

(58) Field of Classification Search
CPC ....... G06F 3/0414; G06F 3/044; G06F 3/0488
See application file for complete search history.

(56) References Cited

U.S. PATENT DOCUMENTS

| | | | |
|---|---|---|---|
| 8,519,971 | B1 | 8/2013 | Mackraz |
| 9,405,400 | B1 | 8/2016 | Khafizov et al. |
| 2002/0005108 | A1 | 1/2002 | Ludwig |
| 2006/0132456 | A1 | 6/2006 | Anson |
| 2008/0289885 | A1 | 11/2008 | Elwell et al. |

(Continued)

FOREIGN PATENT DOCUMENTS

KR 101577277 B1 12/2015

OTHER PUBLICATIONS

Barsness et al., "Web Server That Renders a Web Page Based on a Client Pressure Profile", U.S. Appl. No. 15/887,113, filed Feb. 2, 2018.

(Continued)

*Primary Examiner* — Sepehr Azari
(74) *Attorney, Agent, or Firm* — Martin & Associates, LLC; Derek P. Martin

(57) ABSTRACT

An electronic device includes a pressure-sensitive touch screen display that can dynamically monitor a user's interaction with the device, and adjust the pressure thresholds of different areas of the touch screen display based on the user's monitored interactions. The orientation of the device is determined, the touch screen display is divided into sections, and the device monitors the pressure the user applies in the different sections of the screen. A pressure map is then created that includes pressure detection thresholds specific to the orientation and user for one or more regions of the screen. The device may include different pressure maps for different orientations of the device. When the user interacts with the touch screen, the device determines what the user intended based on the orientation of the device and the thresholds in the pressure map for that orientation for the region of the screen touched by the user.

22 Claims, 6 Drawing Sheets

| | Small Contact Area (Stylus) | Medium Contact Area (Finger) | Large Contact Area (Thumb) |
|---|---|---|---|
| Section 1-1 Pressure A | P1 | P1' | P1" |
| Section 1-1 Pressure B | P2 | P2' | P2" |
| Section 1-1 Pressure C | P3 | P3' | P3" |
| Section 1-2 Pressure A | P4 | P4' | P4" |
| ⋮ | ⋮ | ⋮ | ⋮ |
| Section N-M Pressure X | PY | PY' | PY" |

(56) References Cited

U.S. PATENT DOCUMENTS

| | | | |
|---|---|---|---|
| 2010/0123686 A1* | 5/2010 | Klinghult | G06F 3/0412 |
| | | | 345/178 |
| 2012/0105367 A1* | 5/2012 | Son | G06F 3/0414 |
| | | | 345/174 |
| 2014/0208248 A1 | 7/2014 | Davidson | |
| 2014/0229848 A1 | 8/2014 | Zhang et al. | |
| 2014/0247222 A1* | 9/2014 | Ferren | G02B 13/0065 |
| | | | 345/168 |
| 2015/0084873 A1 | 3/2015 | Hagenbuch et al. | |
| 2015/0091858 A1 | 4/2015 | Rosenberg et al. | |
| 2015/0301671 A1 | 10/2015 | Fan et al. | |
| 2016/0188181 A1 | 6/2016 | Smith | |
| 2016/0378255 A1 | 12/2016 | Butler et al. | |
| 2017/0024074 A1 | 1/2017 | Forlines et al. | |
| 2017/0242539 A1 | 8/2017 | Mani | |

OTHER PUBLICATIONS

IBM, Appendix P—List of IBM Patents or Patent Applications Treated as Related, dated Mar. 2, 2018.

Barsness et al., "Pressure-Sensitive Touch Screen Display and Method", U.S. Appl. No. 15/339,370, filed Oct. 31, 2016.

Barsness et al., "Web Server That Renders a Web Page Based on a Client Pressure Profile", U.S. Appl. No. 15/339,455, filed Oct. 31, 2016.

Barsness et al., "Automatic Generation of a Client Pressure Profile for a Touch Screen Device", U.S. Appl. No. 15/457,594, filed Mar. 13, 2017.

Barsness et al., "Pressure-Sensitive Touch Screen Display and Method", U.S. Appl. No. 15/633,503, filed Jun. 26, 2017.

Barsness et al., "Pressure-Sensitive Touch Screen Display and Method", U.S. Appl. No. 15/277,121, filed Sep. 27, 2016.

Barsness et al., "Pressure-Sensitive Touch Screen Display and Method", U.S. Appl. No. 15/693,412, filed Aug. 31, 2017.

Barsness et al., "Pressure-Sensitive Touch Screen Display and Method", U.S. Appl. No. 15/693,434, filed Aug. 31, 2017.

Barsness et al., "Pressure-Sensitive Touch Screen Display and Method", U.S. Appl. No. 15/812,146, filed Nov. 14, 2017.

IBM, Appendix P—List of IBM Patents or Patent Applications Treated as Related, dated Jan. 31, 2018.

* cited by examiner

| | Small Contact Area (Stylus) | Medium Contact Area (Finger) | Large Contact Area (Thumb) |
|---|---|---|---|
| Section 1-1 Pressure A | P1 | P1' | P1" |
| Section 1-1 Pressure B | P2 | P2' | P2" |
| Section 1-1 Pressure C | P3 | P3' | P3" |
| Section 1-2 Pressure A | P4 | P4' | P4" |
| ⋮ | ⋮ | ⋮ | ⋮ |
| Section N-M Pressure X | PY | PY' | PY" |

PRESSURE-SENSITIVE TOUCH SCREEN DISPLAY AND METHOD

BACKGROUND

1. Technical Field

This disclosure generally relates to electronic devices with touch screen displays, and more specifically relates to devices with a pressure-sensitive touch screen display.

2. Background Art

Users interact with electronic devices that have touch screen displays, such as smart phones, in different ways. Most people use their fingers or thumbs most of the time, while some use a stylus. Apple, Inc. introduced a touch screen display in the Apple 6 phones that is pressure-sensitive, meaning a light touch on a pressure-sensitive graphic can cause a first action, a medium touch can cause a second action, and a heavy touch can cause a third action. This pressure-sensitive touch screen display is supported in the iOS 9 and iOS 10 by Apple that runs on Apple devices, and is called 3D Touch by Apple. 3D Touch is a trademark of Apple, Inc.

Different users use their devices in different manners. For example, some prefer to hold their phone in a portrait orientation, and scroll or select items on the screen with the thumb of the hand that is holding the phone. Some prefer to hold their phone in a landscape orientation, and scroll and select items on the screen with the thumbs of both hands. Two-handed operation is often preferred for typing text, such as when texting someone. Some prefer to use fingers instead of thumbs. People also use their devices in different orientations depending on the application they are using.

The different ways people use their devices may make using a pressure-sensitive touch screen somewhat difficult for some users. What a user intends to be a light touch could be interpreted as a medium touch. The orientation of the device comes into play, because a user holding a phone in portrait orientation in her right hand would likely produce different amounts of pressure depending on the location on the screen being touched. Thus, the user holding the phone in her right hand might touch an item close to the right edge with much less force than when touching an item in the middle or on the left edge of the screen. This is due to the anatomical features of a person's hands. Thus, a user may touch an item on the right side of the screen intending a medium touch, but the device recognizes the touch as a light touch, which is not what the user intended.

SUMMARY

An electronic device includes a pressure-sensitive touch screen display that can dynamically monitor a user's interaction with the device, and adjust the pressure thresholds of different areas of the touch screen display based on the user's monitored interactions. The orientation of the device is determined, the touch screen display is divided into sections, and the device monitors the pressure the user applies in the different sections of the screen. A pressure map is then created that includes pressure detection thresholds specific to the orientation and user for one or more regions of the screen, which may include multiple screen sections. The device may include different pressure maps for different orientations of the device. When the user interacts with the touch screen, the device determines what the user intended based on the orientation of the device and the thresholds in the pressure map for that orientation for the region of the screen touched by the user.

The disclosure and claims herein support an electronic device comprising: at least one processor; a memory coupled to the at least one processor; a touch screen display coupled to the at least one processor, the touch screen display comprising a pressure-sensitive interface that is capable of detecting a plurality of pressures when a user selects a displayed item on the touch screen display; and a pressure-sensitive interface mechanism residing in the memory and executed by the at least one processor, the pressure-sensitive interface mechanism dynamically monitoring a user's interaction with the touch screen display, and adjusting pressure thresholds of a plurality of areas of the touch screen display based on the user's monitored interactions with the touch screen display.

The disclosure and claims herein further support an electronic device that includes an orientation mechanism that determines physical orientation of the device; and at least one pressure map of the touch screen display that includes a plurality of pressure thresholds for a plurality of sections of the touch screen display in a selected orientation defined by the orientation mechanism.

The disclosure and claims herein further support an electronic device further comprising a calibration mechanism that prompts the user to press a plurality of regions on the touch screen display using a plurality of pressures with the device in a plurality of orientations, logs the plurality of pressures, and generates a plurality of pressure maps of the touch screen display that each includes: a selected orientation; a plurality of sections of the touch screen display; and for each one of the plurality of sections of the touch screen display, a plurality of pressure thresholds customized to the user based on the plurality of pressures the user used to press the one section of the touch screen display.

The disclosure and claims herein further support an electronic device wherein the pressure-sensitive interface mechanism detects pressure on the displayed item in a selected region of the touch screen display, determines from an orientation of the device and a pressure map corresponding to the orientation a plurality of pressure detection thresholds for the selected region of the touch screen display, and takes action based on the detected pressure on the displayed item and the plurality of pressure detections thresholds for the selected region of the touch screen display.

The disclosure and claims herein further support a method for a user to interact with an electronic device comprising: providing a touch screen display on the device that comprises a pressure-sensitive interface that is capable of detecting a plurality of pressures when a user selects a displayed item on the touch screen display; and dynamically monitoring a user's interaction with the touch screen display, and adjusting pressure thresholds of a plurality of areas of the touch screen display based on the user's monitored interactions.

The disclosure and claims herein further support a method for a user to interact with an electronic device comprising: determining a physical orientation of the device; and generating at least one pressure map of the touch screen display that includes a plurality of pressure thresholds for a plurality of sections of the touch screen display in a selected orientation defined by the orientation mechanism.

The disclosure and claims herein further support a method for a user to interact with an electronic device comprising: prompting the user to press a plurality of regions on the touch screen display using a plurality of pressures with the device in a plurality of orientations; logging the plurality of pressures; and generating a plurality of pressure maps of the touch screen display that each includes: a selected orientation; a plurality of sections of the touch screen display; and for each one of the plurality of sections of the touch screen display, a plurality of pressure thresholds customized to the user based on the plurality of pressures the user uses to press the one section of the touch screen display.

The disclosure and claims herein further support a method for a user to interact with an electronic device comprising: detecting pressure on a displayed item in a selected region of the touch screen display; determining from an orientation of the device and a pressure map corresponding to the orientation a plurality of pressure detection thresholds for the selected region of the touch screen display; and taking action based on the detected pressure on the item and the plurality of pressure detections thresholds for the selected region of the touch screen display.

The disclosure and claims herein further support an article of manufacture comprising software stored on a computer readable storage medium, the software comprising: a pressure-sensitive interface mechanism that dynamically monitors a user's interaction with a touch screen display comprising a pressure-sensitive interface that is capable of detecting a plurality of pressures when a user selects an item on the touch screen display, and that dynamically adjusts pressure thresholds of a plurality of areas of the touch screen display based on the user's monitored interactions.

The disclosure and claims herein further support an article of manufacture comprising software stored on a computer readable storage medium, the software further comprising: an orientation mechanism that determines physical orientation of the device; and at least one pressure map of the touch screen display that includes a plurality of pressure thresholds for a plurality of sections of the touch screen display in a selected orientation defined by the orientation mechanism.

The disclosure and claims herein further support an article of manufacture comprising software stored on a computer readable storage medium, the software further comprising a calibration mechanism that prompts the user to press a plurality of regions on the touch screen display using a plurality of pressures with the device in a plurality of orientations, logs the plurality of pressures, and generates a plurality of pressure maps of the touch screen display that each includes: a selected orientation; a plurality of sections of the touch screen display; and for each one of the plurality of sections of the touch screen display, a plurality of pressure thresholds customized to the user based on the plurality of pressures the user uses to press the one section of the touch screen display.

The disclosure and claims herein further support an article of manufacture comprising software stored on a computer readable storage medium, wherein the pressure-sensitive interface mechanism detects pressure on a displayed item in a selected region of the touch screen display, determines from an orientation of the device and a pressure map corresponding to the orientation a plurality of pressure detection thresholds for the selected region of the touch screen display, and takes action based on the detected pressure on the displayed item and the plurality of pressure detections thresholds for the selected region of the touch screen display.

The disclosure and claims herein further support an electronic device comprising: at least one processor; a memory coupled to the at least one processor; a touch screen display coupled to the at least one processor, the touch screen display comprising a pressure-sensitive interface that is capable of detecting a plurality of pressures when a user selects an item on the touch screen display; an orientation mechanism that determines physical orientation of the device; a pressure-sensitive interface mechanism residing in the memory and executed by the at least one processor, the pressure-sensitive interface mechanism comprising: a calibration mechanism that prompts the user to press a plurality of regions on the touch screen display using a plurality of pressures with the device in a plurality of orientations, and logs the plurality of pressures, wherein the plurality of regions on the touch screen display each comprises at least one of a plurality of sections of the touch screen display; a pressure mapping mechanism that generates from the logs a first pressure map of the touch screen display that includes: a first orientation of the device; a first plurality of sections of the touch screen display; and for each one of the first plurality of sections of the touch screen display, a first plurality of pressure thresholds customized to the user based on the plurality of pressures the user uses to press the one of the first plurality of sections of the touch screen display; wherein the pressure mapping mechanism generates from the logs a second pressure map of the touch screen display that includes: a second orientation of the device; a second plurality of sections of the touch screen display; and for each one of the second plurality of sections of the touch screen display, a second plurality of pressure thresholds customized to the user based on the plurality of pressures the user uses to press the one of the second plurality of sections of the touch screen display; a usage monitor mechanism that dynamically monitors a user's interaction with the touch screen display, and adjusts at least one of the plurality of pressure thresholds based on the user's monitored interactions; and wherein the pressure-sensitive interface mechanism detects pressure on a displayed item in a selected region of the touch screen display, determines from an orientation of the device and a pressure map corresponding to the orientation a plurality of pressure detection thresholds for the selected region of the touch screen display, and takes action based on the detected pressure on the displayed item and the plurality of pressure detections thresholds for the selected region of the touch screen display.

The disclosure and claims herein further support a method for a user to interact with an electronic device comprising: providing a touch screen display on the device that comprises a pressure-sensitive interface that is capable of detecting a plurality of pressures when a user selects an item on the touch screen display; prompting the user to press a plurality of regions on the touch screen display using a plurality of pressures with the device in a plurality of orientations, wherein the plurality of regions on the touch screen display each comprises at least one of a plurality of sections of the touch screen display; logging the plurality of pressures; generating from the logged plurality of pressures a first pressure map of the touch screen display that includes: a first orientation of the device; a first plurality of sections of the touch screen display; and for each one of the first plurality of sections of the touch screen display, a first plurality of pressure thresholds customized to the user based on the plurality of pressures the user uses to press the one of the first plurality of sections of the touch screen display; generating from the logged plurality of pressures a second pressure map of the touch screen display that includes: a second orientation of the device; a second plurality of sections of the touch screen display; and for each one of the second plurality of sections of the touch screen display, a second plurality of pressure thresholds customized to the user based on the plurality of pressures the user uses to press the one of the second plurality of sections of the touch screen display; detecting pressure on a displayed item in a selected region of the touch screen display; determining from an orientation of the device and a pressure map corresponding to the orientation a plurality of pressure detection thresholds for the selected region of the touch screen display; and taking action based on the detected pressure on the displayed item and the plurality of pressure detections thresholds for the selected region of the touch screen display.

The foregoing and other features and advantages will be apparent from the following more particular description, as illustrated in the accompanying drawings.

BRIEF DESCRIPTION OF THE DRAWING(S)

The disclosure will be described in conjunction with the appended drawings, where like designations denote like elements, and:

DETAILED DESCRIPTION

The disclosure and claims herein relate to an electronic device that includes a pressure-sensitive touch screen display that can dynamically monitor a user's interaction with the device, and adjust the pressure thresholds of different areas of the touch screen display based on the user's monitored interactions. The orientation of the device is determined, the touch screen display is divided into sections, and the device monitors the pressure the user applies in the different sections of the screen. A pressure map is then created that includes pressure detection thresholds specific to the orientation and user for one or more regions of the screen, which may include multiple screen sections. The device may include different pressure maps for different orientations of the device. When the user interacts with the touch screen, the device determines what the user intended based on the orientation of the device and the thresholds in the pressure map for that orientation for the region of the screen touched by the user.

Figure 1:
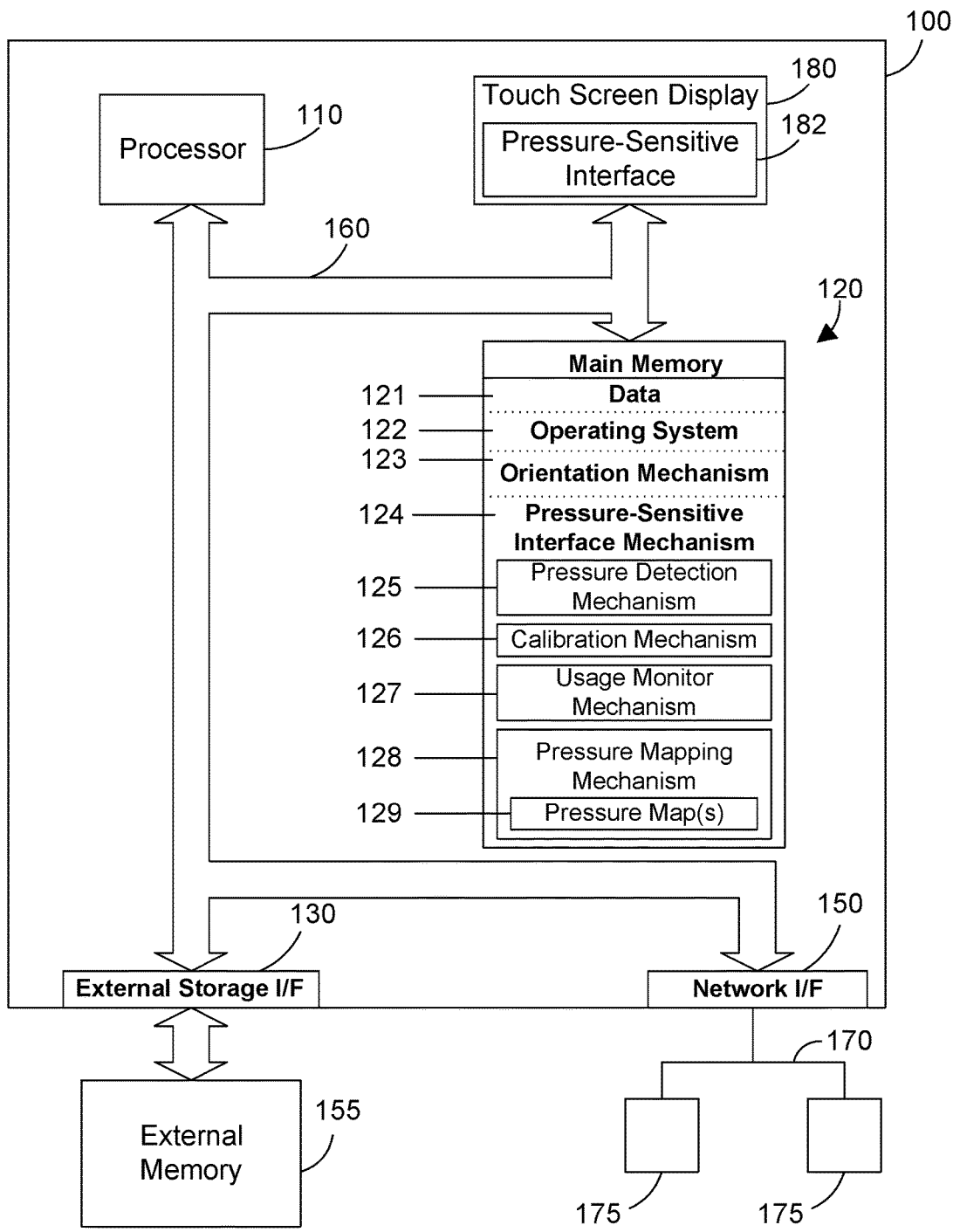
FIG. 1 is a block diagram of an electronic device that includes a pressure-sensitive touch screen display.

Referring to FIG. 1, a device 100 represents any suitable type of electronic device, including without limitation a smart phone, tablet computer, electronic book reader, notebook computer, laptop computer, gaming console, smart watch, etc. Those skilled in the art will appreciate that the disclosure herein applies equally to any type of electronic device. As shown in FIG. 1, a device 100 comprises one or more processors 110, a main memory 120, an external storage interface 130, a network interface 150, and a touch screen display 180. These system components are interconnected through the use of a system bus 160. External storage interface 130 is used to access external memory. One specific type of external memory 155 is non-volatile memory on an external device, such as an SD card, a micro-SD card, or a thumb drive.

Main memory 120 preferably contains data 121, an operating system 122, an orientation mechanism 123, and a pressure-sensitive interface mechanism 124. Data 121 represents any data that serves as input to or output from any program in device 100. Operating system 122 could be any suitable operating system for an electronic device. Known operating systems for electronic devices include the iOS operating system developed by Apple, Inc., the Android operating system developed by Google, and the Windows operating system developed by Microsoft.

The orientation mechanism 123 allows the device 100 to determine its physical orientation in space. Known devices include one or more accelerometers that communicate with an orientation mechanism 123 and thus allow determining the device's physical orientation in space, meaning both physical location and angle or direction of the device at that physical location. One such use of a device's orientation mechanism 123 is to rotate the screen when the orientation of the screen is moved by a user from portrait to landscape position, and vice versa. Orientation mechanism 123 is well-known in the art of electronic devices, and therefore is not discussed in more detail here.

Touch screen display 180 is a display that allows the user to select functions on the device 100 by touching displayed items on the touch screen display 180. The touch screen display 180 includes a pressure-sensitive interface 182. The pressure-sensitive interface 182 allows the touch screen display 180 to detect multiple pressure levels for a user selection on the touch screen. Any suitable number of pressure levels could be detected by the pressure-sensitive interface 182. In one suitable example, the pressure-sensitive interface 182 can distinguish between three different pressure levels, denoted herein as a light touch, a medium touch, and a heavy touch. Of course, any suitable number of pressure levels could be detected by the pressure-sensitive interface 182 within the scope of the disclosure and claims herein.

The pressure-sensitive interface mechanism 124 is software that interacts with the pressure-sensitive interface 182 on the touch screen display 180 to detect the pressure applied to the pressure-sensitive interface, and what actions to perform based on the detected pressure. The pressure-sensitive interface mechanism 124 includes a pressure detection mechanism 125, a calibration mechanism 126, a usage monitor mechanism 127, and a pressure mapping mechanism 128. The pressure detection mechanism 125 interacts with the pressure-sensitive interface 182 to determine the pressure applied when a user selects an item displayed on the touch screen display 180. The calibration mechanism 126 is an optional mechanism that allows calibrating the pressure-sensitive interface mechanism 124 for a particular user. The usage monitor mechanism 127 monitors how a user uses the device 100, and allows the pressure-sensitive interface mechanism 125 to dynamically make changes based on the monitored usage. The pressure mapping mechanism 128 creates one or more pressure maps 129 that include multiple pressure thresholds for different sections or regions of the touch screen display 180, as described in more detail below.

Main memory 120 may include any suitable combination of different memory types. For example, main memory 120 could include dynamic random access memory (DRAM) that has a relatively small size and a fast access time and could also include non-volatile memory (NVRAM) that has a much larger size and a slower access time. Programs stored in NVRAM could then be loaded into the DRAM in order to be executed by the processor 110. This simple example shows the main memory 120 can include any suitable number and type of memories in any suitable hierarchy, whether currently known or developed in the future.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the orientation mechanism 123 and pressure-sensitive interface mechanism 124 under the control of the operating system 122.

Although device 100 is shown to contain only a single processor and a single system bus, those skilled in the art will appreciate that a pressure-sensitive interface mechanism may be practiced using a device that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Network interface 150 is used to connect device 100 to a network 170. Network interface 150 broadly represents any suitable way to interconnect electronic devices, such as device 100, to other devices 175, regardless of whether the network 170 comprises present-day analog and/or digital techniques or via some networking mechanism of the future. Network interface 150 preferably includes a combination of hardware and software that allow communicating on the network 170. The network interface 150 can include multiple different network interfaces. For example, network interface 150 could include a wireless interface for communicating with a 4G network, a WiFi interface for communicating with a WiFi network, and a Bluetooth interface for communicating with other devices via Bluetooth. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
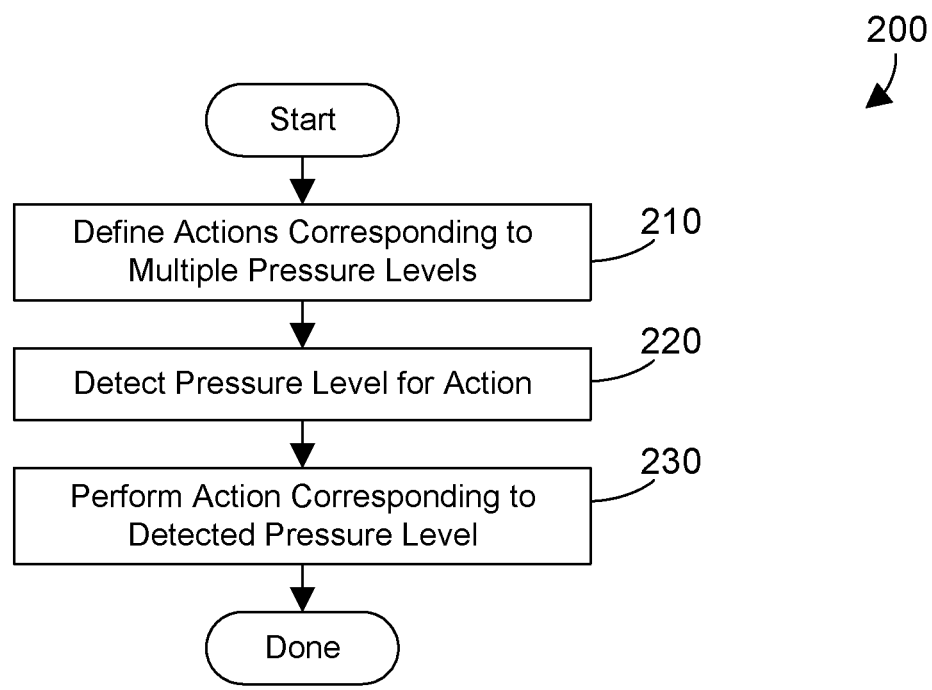
FIG. 2 is a flow diagram of a method for detecting a user's actions on a pressure-sensitive touch screen display.

Referring to FIG. 2, a method 200 is representative of the function of the 3D Touch interface by Apple, Inc. Method 200 assumes a touch screen with pressure-sensitive interface is part of the device. Actions corresponding to multiple pressure levels are defined (step 210). A pressure level for each action is detected (step 220), and an action corresponding to a detected pressure level is performed (step 230). Note that method 200 defines actions that correspond to multiple pressure levels in step 210, but each of these multiple pressure levels is the same across the entire touch screen display. Thus, a light touch is defined by the touch screen display as being a touch anywhere on the touch screen display that is less than a first pressure detection threshold. A medium touch is defined as being a touch anywhere on the touch screen display that is greater than the first pressure detection threshold but less than a second pressure detection threshold. A heavy touch is defined as being a touch anywhere on the touch screen display that is greater than the second pressure detection threshold. The pressure detection thresholds are thus the same across the entire surface of the touch screen display. As discussed in the Background section above, a user may apply different pressures to different portions of the screen based on the orientation of the device and whether the user uses a stylus, finger or thumb to select an item on the touch screen display. Thus, a user may have to concentrate on applying the correct amount of pressure in different regions of the screen.

Figure 3:
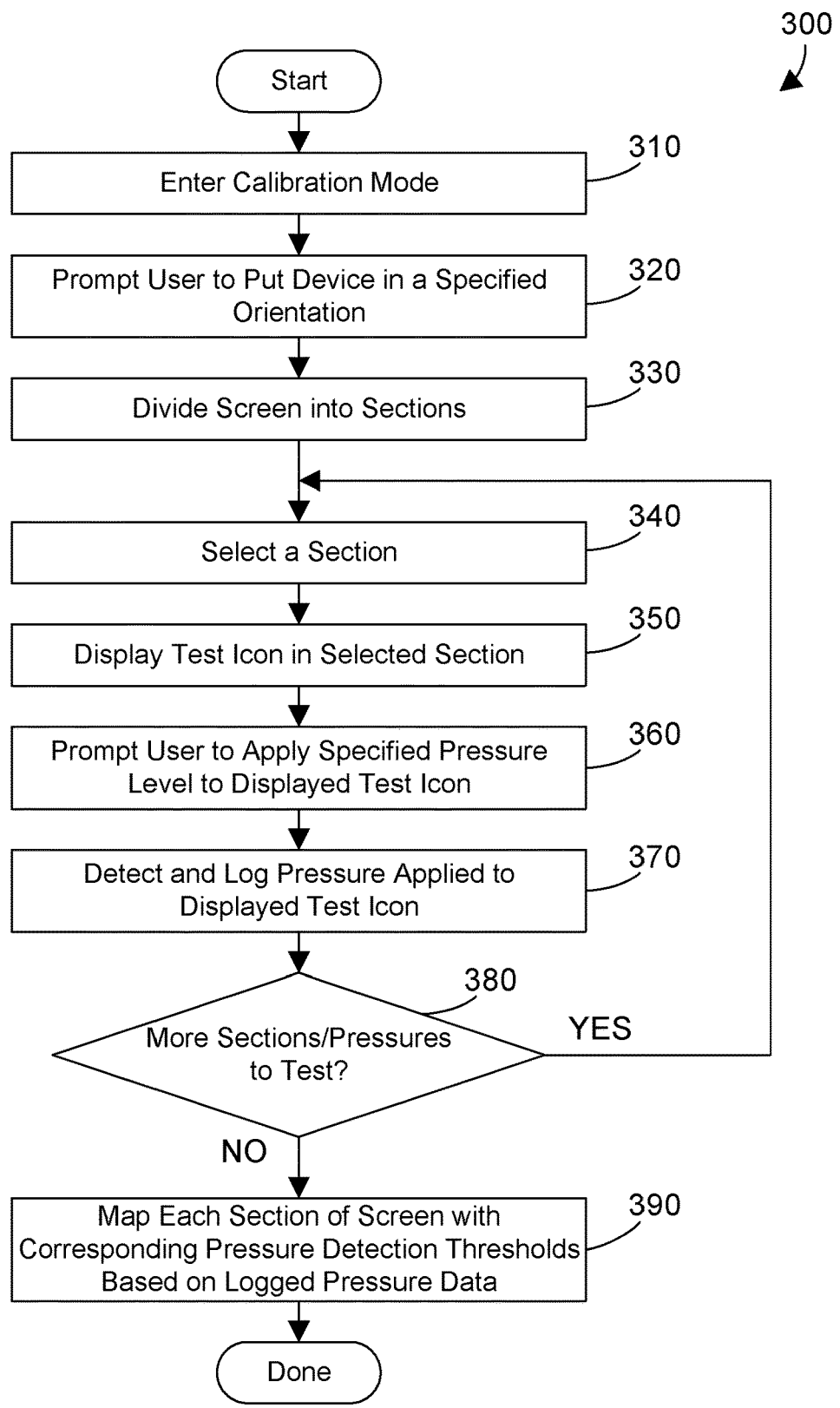
FIG. 3 is a flow diagram of a method for creating a pressure map of a pressure-sensitive touch screen display based on a user's use of the phone in a calibration mode.

The disclosure and claims herein reduce the issues that arise from users applying different pressures to different areas of a touch screen display while intending to apply similar pressure. Referring to FIG. 3, a method 300 is preferably performed by the pressure-sensitive interface mechanism 124 shown in FIG. 1. Method 300 begins by entering a calibration mode (step 310). The calibration mode, represented by steps 320-390 in FIG. 3, are preferably performed under control of the calibration mechanism 126 shown in FIG. 1. The user is prompted to put the device in a specified orientation (step 320). Examples of specified orientation include portrait mode where the longest portion of the device is running up and down, and landscape mode where the longest portion of the device is running side to side. Of course, other orientations are also possible, such as any suitable position between portrait mode and landscape mode. In addition, the orientations may include the angle at which the user holds the device. In the most preferred implementation, when the user is prompted in step 320 to place the device in portrait orientation, for example, the user will hold the device in portrait orientation at the angle the user prefers. Note that once the user is prompted to put the device in a specified orientation, method 300 then proceeds to step 330 once the orientation mechanism 123 in FIG. 1 detects the device is in the specified orientation.

With the device in the specified orientation, the screen on the touch screen display is then divided into sections (step 330). Any suitable geometrical shape of sections could be used, including squares, triangles, rectangles, polygons, etc. In the most preferred implementation, the screen is divided up into a grid of square or rectangular sections in step 330. A section is selected (step 340). A test icon is displayed in the selected section (step 350). The user is then prompted to apply a specified pressure level to the displayed test icon (step 360). Examples of specified pressure levels could include light, medium and heavy. However, the disclosure and claims herein extend to any suitable number of pressure levels. The user then applies the specified pressure level to the test icon, and the pressure is detected and logged (step 370) by the pressure detection mechanism 125 shown in FIG. 1. When there are more sections or pressures to test (step 380=YES), method 300 loops back to step 340 and continues. In the example where there are three different pressure levels, light, medium and heavy, a section will be selected in step 340, the user is prompted to apply light pressure to the displayed test icon in step 360, the pressure is detected and logged in step 370, then method 300 loops back and repeats steps 340-380 while prompting the user to apply medium pressure, then method 300 loops back and repeats steps 340-380 while prompting the user to apply heavy pressure. Method 300 then loops back and selects the next section to test, and repeats the three-pass process to log the three pressure levels for the next section, and so on. In the most preferred implementation, the calibration mode logs all defined pressure levels for all sections of the touch screen display during the calibration mode. Note, however, that less than all the defined pressures in less than all the defined sections could also be tested and logged in calibration mode. When there are no more sections or pressures to test (step 380=NO), a pressure map is created that maps each section of the screen with corresponding pressure detection thresholds based on the logged pressure data (step 390). The creation of the pressure map in step 390 is preferably performed by the pressure mapping mechanism 128 creating one or more pressure maps 129 shown in FIG. 1. Method 300 is then done.

Figure 4:
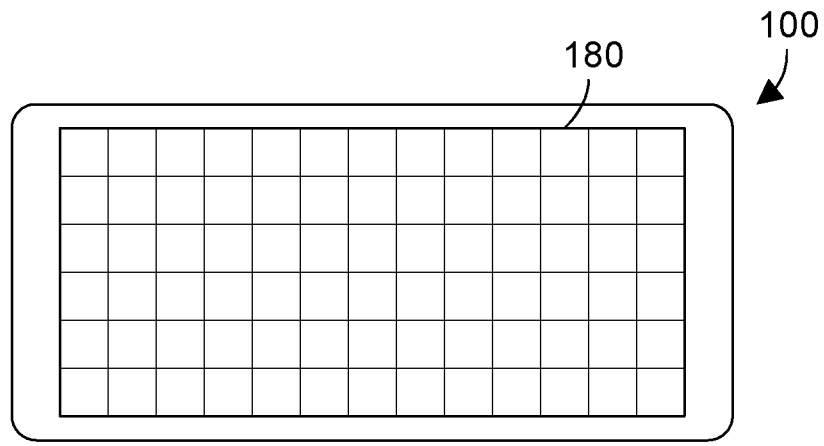
FIG. 4 is a block diagram showing a device in landscape orientation with the touch screen display divided into multiple sections.

The steps in method 300 in FIG. 3 could be repeated for each orientation of the device. This would result in multiple sections of the touch screen display that have a first set of pressure thresholds in one orientation, and a second set of pressure thresholds in a different orientation. Of course, the number and shape of the sections could vary between the different variations. Thus, a landscape orientation as shown in FIG. 4 could have a grid of squares as shown, while a portrait orientation could have an array of much larger hexagons. Any suitable combination of orientations, section size, and section shape may be used within the scope of the disclosure and claims herein.

FIG. 4 shows one suitable example of an electronic device 100 with a touch screen display 180 that is divided into sections, as discussed in step 330 in FIG. 3. Each section is represented by a square in the grid shown in FIG. 4. In the most preferred implementation, each section of the touch screen display could have its own pressure detection thresholds. However, it is equally within the scope of the disclosure and claims herein to have multiple sections of the touch screen display share common pressure detection thresholds. In addition, the shape and number of sections may vary within the scope of the disclosure and claims herein.

Figure 5:
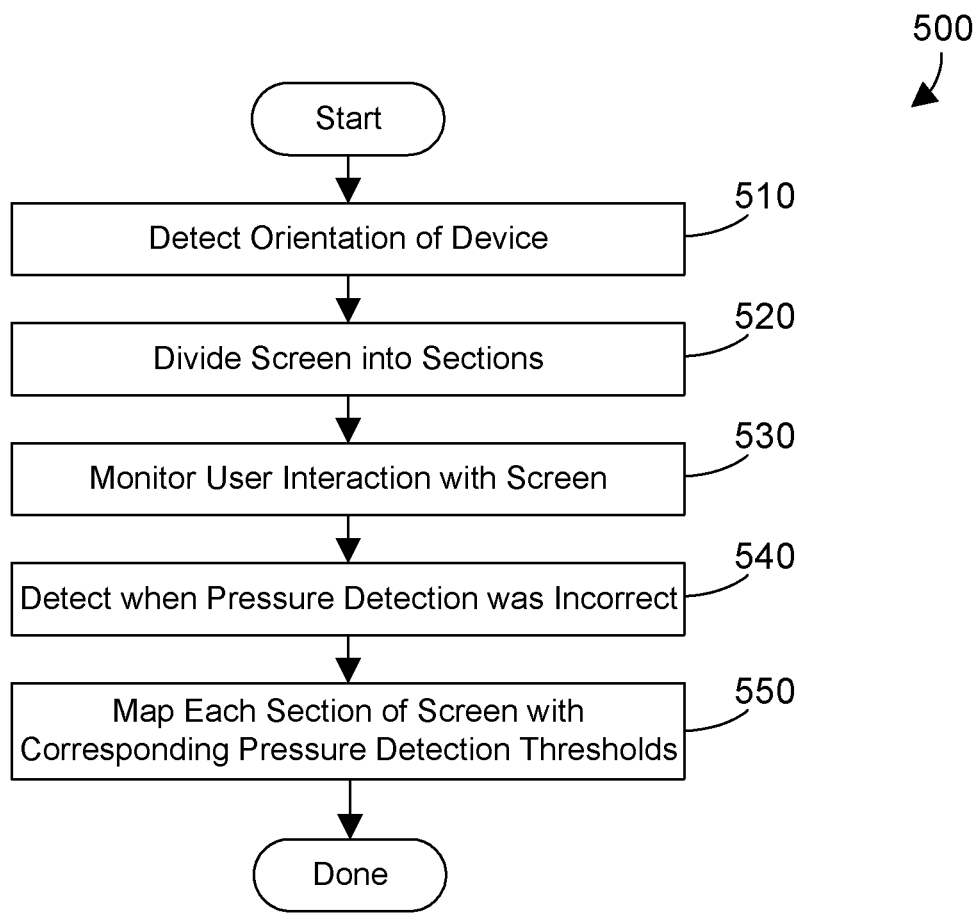
FIG. 5 is flow diagram of a method for creating or updating a pressure map of a pressure-sensitive touch screen display based on monitored user interaction with the pressure-sensitive touch screen display.

Referring to FIG. 5, a method 500 is preferably performed once the user is using the device day to day. The orientation of the device is detected (step 510). The screen is divided into sections (step 520). The user interaction with the screen is monitored (step 530). Monitoring the user interaction with the screen is preferably performed by the usage monitor mechanism 127 shown in FIG. 1. Next, detect when the pressure detection was incorrect (step 540). For example, when the user selects a pressure-sensitive item, then goes back or selects the item again with a different pressure, this is an indication the pressure detection was incorrect in the first instance. A pressure map is then created where each section of the screen is mapped with corresponding pressure detection thresholds (step 550). The pressure map is preferably created by the pressure mapping mechanism 128 shown in FIG. 1.

In a first preferred implementation, method 500 in FIG. 5 is performed after the calibration in method 300 in FIG. 3 is performed. In this case, the screen sections in step 520 will correspond to the screen sections defined in step 330. In other words, the calibration method 300 shown in FIG. 3 can initially define multiple pressure detection thresholds for multiple screen sections, then method 500 can continuously monitor the user's usage of the device and dynamically update any of the pressure detection thresholds for any of the screen sections, as needed.

In a second preferred implementation, method 500 in FIG. 5 is performed without performing the calibration in method 300 in FIG. 3. When this is the case, we assume each of the screen sections have the same multiple pressure detection thresholds to start. Then as the user's usage is monitored in method 500, one or more of these pressure detection thresholds is adjusted to better match the user's usage of the device.

Figure 6:
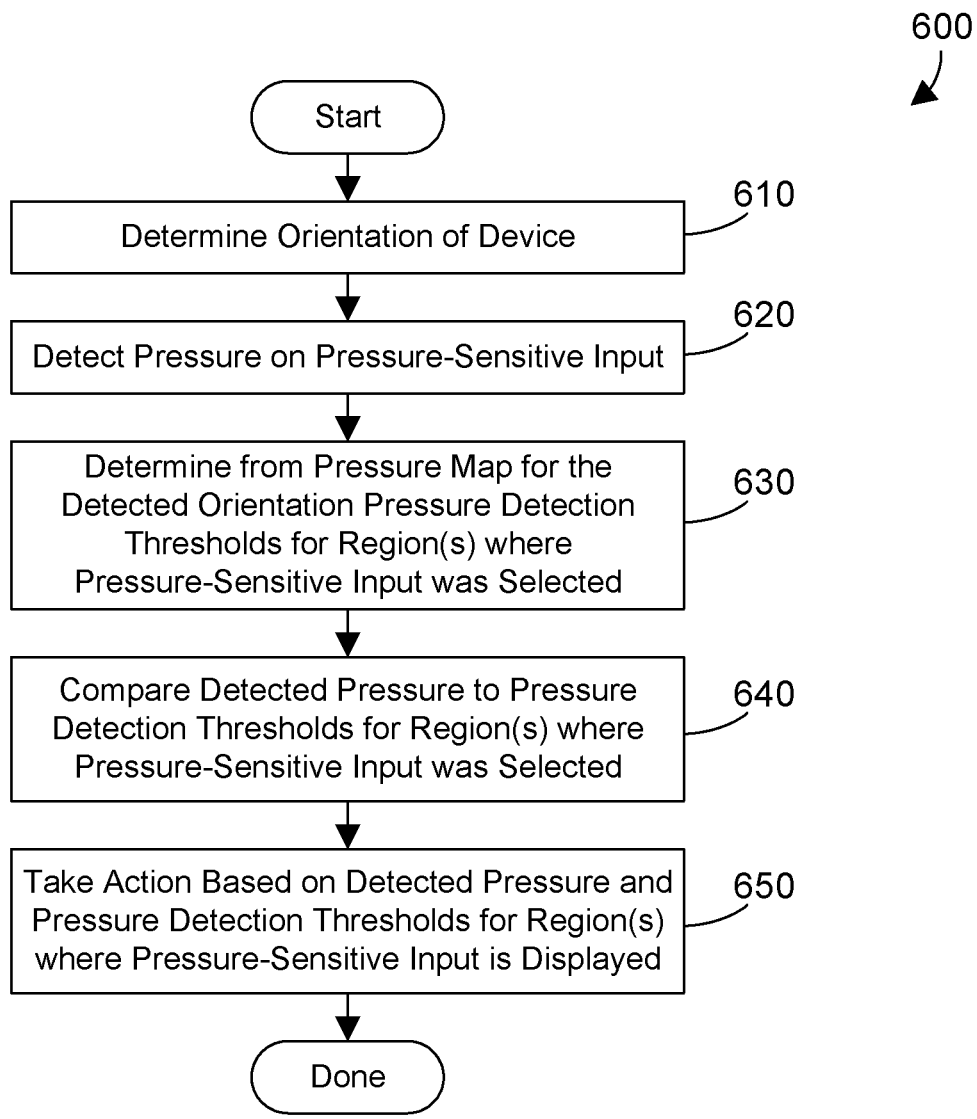
FIG. 6 is a flow diagram of a method for using pressure detection thresholds in the pressure map for one or more regions of the touch screen display when a pressure-sensitive input on the touch screen display is selected by the user.

Once one or more pressure maps are created, either in step 390 in FIG. 3 and/or in step 550 in FIG. 5, the user's actions on the touch screen display may then be interpreted according to the pressure map(s). Referring to FIG. 6, a method 600 is preferably performed by the pressure-sensitive interface mechanism 124 shown in FIG. 1. The orientation of the device is determined (step 610). The pressure by a user on a pressure-sensitive input displayed on the touch screen display is then detected (step 620). From the pressure map for the detected orientation, pressure detection thresholds for one or more regions where the pressure-sensitive input was selected are determined (step 630). Note the term "region" as used herein may include one or more sections of the touch screen display. For example, an icon selected by the user could span multiple sections of the touch screen display, which together comprise the region of the touch screen display touched by the user. The detected pressure is then compared to the pressure detection thresholds for the region(s) where the pressure-sensitive input was selected (step 640). Action is then taken based on the detected pressure and the applicable pressure detection thresholds (step 650). A simple example will illustrate. We assume the device is in a portrait orientation, which is detected in step 610. An icon is displayed on the touch screen display that is contained within a single section of the screen, which we arbitrarily name S5. Step 620 detects the pressure the user uses when the user touches the icon in section S5. Next, the pressure map for the portrait orientation is consulted in step 630 to determine the appropriate pressure detection thresholds for section S5 of the touch screen display. For this example, we assume a light touch is defined as a pressure less than P1, a medium touch is defined as a pressure between P1 and P2, and a heavy touch is defined as a pressure greater than P2. We now compare the detected pressure to these three pressure detection thresholds P1, P2 and P3 for section S5. For this simple example, we assume the detected pressure is between P1 and P2 in step 640, which corresponds to a medium touch. Action is then taken in step 650 based on the medium touch by the user. Note the example above is extremely simplified for the purpose of illustration. However, one skilled in the art will recognize that many different examples and variations are possible within the scope of the disclosure and claims herein.

Figures 7, 8:
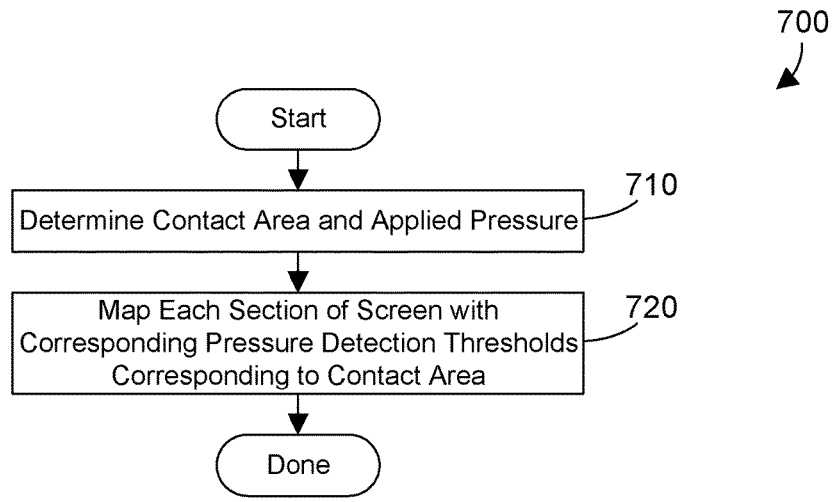
FIG. 7 is a flow diagram of a method for creating different pressure detection thresholds based on contact area.
FIG. 8 is a table showing examples of pressure detection thresholds that can vary depending on the detected contact area on the touch screen display.

In addition to detecting when a user selects a pressure-sensitive input on the touch screen display, it is also possible to detect how the user selected the pressure-sensitive input based on the contact area on the touch screen display. Referring to FIG. 7, method 700 is preferably performed by the pressure-sensitive interface mechanism 124 shown in FIG. 1. The contact area and applied pressure of a user selection is determined (step 710). Each section of the screen can then be mapped with corresponding pressure detection thresholds corresponding to the contact area (step 720). Method 700 is then done.

One specific example to illustrate the principles in method 700 is shown in the table in FIG. 8. We assume a small contact area corresponds to when the user uses a stylus; a medium contact area corresponds to when the user uses a finger; and a large contact area corresponds to when the user uses a thumb. With these three different contact areas, it is now possible to define a pressure map that includes pressure detection thresholds for each of these contact areas. For the simple example shown in FIG. 8, we assume Section 1-1 defines a lower threshold Pressure A, a medium threshold Pressure B, and an upper threshold Pressure C. The values of these thresholds can vary according to contact area. Thus, Pressure A for Section 1-1 in FIG. 8 is P1 for the small contact area, P1' for the medium contact area, and P1" for the large contact area. In similar fashion, Pressures B and C for Section 1-1 each have corresponding pressures for the three different contact areas. Similarly, nine separate pressure detection thresholds could be defined for each of the other sections on the touch screen display as a function of contact area. The result is a pressure map that has a finer granularity due to taking contact area into account. Thus, the pressure a user applies using a stylus can be different than the pressure the user applies using a thumb while still providing the same functionality according to the user's usage of the device and the detected contact area.

The disclosure and claims herein provide an improvement over the prior art, such as the 3D Touch interface on Apple devices. Instead of having pressure thresholds that are consistent across the screen, the pressure thresholds can vary across the screen, thus allowing the device to be customized according to the user's needs. This allows the device to account for differences in orientation and whether a stylus, finger or thumb is used to touch a pressure-sensitive input. In addition, this allows the device to be customized according to how a user actually uses the device. This could be beneficial, for example, for those who have limited mobility in a finger or who have a missing finger or thumb. This could also be beneficial for a person who has trouble touching with their fingers, such as those who have arthritis in their fingers or hands. The pressure-sensitive interface mechanism disclosed herein thus allows customizing the pressure required for performing a desired action on a pressure-sensitive touch screen display.

The disclosure and claims herein relate to an electronic device that includes a pressure-sensitive touch screen display that can dynamically monitor a user's interaction with the device, and adjust the pressure thresholds of different areas of the touch screen display based on the user's monitored interactions. The orientation of the device is determined, the touch screen display is divided into sections, and the device monitors the pressure the user applies in the different sections of the screen. A pressure map is then created that includes pressure detection thresholds specific to the orientation and user for one or more regions of the screen, which may include multiple screen sections. The device may include different pressure maps for different orientations of the device. When the user interacts with the touch screen, the device determines what the user intended based on the orientation of the device and the thresholds in the pressure map for that orientation for the region of the screen touched by the user.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An electronic device comprising:
at least one processor;
a memory coupled to the at least one processor;
a touch screen display coupled to the at least one processor, the touch screen display comprising a pressure-sensitive interface that is capable of detecting a plurality of pressures when a user touches a displayed item on the touch screen display and interpreting each of the plurality of pressures as a different action with respect to the displayed item;
a pressure map of the touch screen display that defines a plurality of pressure thresholds for each of a plurality of sections of the touch screen display, wherein a first pressure threshold for a first of the plurality of sections corresponds to a first action when the user touches the displayed item in the first section with a first pressure, and a second pressure threshold for the first section corresponds to a second action when the user touches the displayed item in the first section with a second pressure; and
a pressure-sensitive interface mechanism residing in the memory and executed by the at least one processor, the pressure-sensitive interface mechanism performing a calibration of the touch screen display by:
 (a) prompting the user to put the electronic device in a portrait orientation;
 (b) dividing the touch screen display into the plurality of sections;
 (c) selecting one of the plurality of sections;
 (d) displaying a test icon in the selected one section;
 (e) prompting the user to apply a specified pressure level to the displayed test icon;
 (f) detecting and logging the pressure applied by the user to the displayed test icon;
 (g) repeating steps (c) through (f) for each of the plurality of pressure thresholds in each of the plurality of sections;
 (h) constructing a pressure map for the portrait orientation using the data detected and logged in step (f);
 (i) prompting the user to put the electronic device in a landscape orientation;
 (j) dividing the touch screen display into the plurality of sections;
 (k) selecting one of the plurality of sections;
 (l) displaying a test icon in the selected one section;
 (m) prompting the user to apply a specified pressure level to the displayed test icon;
 (n) detecting and logging the pressure applied by the user to the displayed test icon;
 (o) repeating steps (k) through (n) for each of the plurality of pressure thresholds in each of the plurality of sections; and
 (p) constructing a pressure map for the landscape orientation using the data detected and logged in step (n);
wherein the pressure-sensitive interface mechanism uses the pressure map for the portrait orientation when the electronic device is in the portrait orientation and uses the pressure map for the landscape orientation when the electronic device is in the landscape orientation.

2. The electronic device of claim 1 further comprising:
an orientation mechanism that determines physical orientation of the electronic device including when the electronic device is in the portrait orientation and when the electronic device is in the landscape orientation.

3. The electronic device of claim 1 further comprising a plurality of pressure maps for the portrait orientation, wherein the plurality of pressure maps for the portrait orientation comprises:
a first pressure map that defines for the portrait orientation of the electronic device pressure thresholds for each of the plurality of sections when the user uses a stylus; and
a second pressure map that defines for the portrait orientation pressure thresholds for each of the plurality of sections when the user uses a finger.

4. The electronic device of claim 3 wherein the plurality of pressure maps for the portrait orientation further comprises:
a third pressure map that defines for the portrait orientation pressure thresholds for each of the plurality of sections when the user uses a thumb.

5. The electronic device of claim 4 wherein the pressure-sensitive interface mechanism detects when the user uses the stylus, finger or thumb based on detecting contact area with the touch screen display, and uses one of the first, second and third pressure maps that corresponds to the detected stylus, finger or thumb when the electronic device is in the portrait orientation.

6. The electronic device of claim 1 further comprising a plurality of pressure maps for the landscape orientation, wherein the plurality of pressure maps for the landscape orientation comprises:
   a fourth pressure map that defines for the landscape orientation of the electronic device pressure thresholds for each of the plurality of sections when the user uses a stylus; and
   a fifth pressure map that defines for the landscape orientation pressure thresholds for each of the plurality of sections when the user uses a finger.

7. The electronic device of claim 6 wherein the plurality of pressure maps for the landscape orientation further comprises:
   a sixth pressure map that defines for the landscape orientation pressure thresholds for each of the plurality of sections when the user uses a thumb.

8. The electronic device of claim 7 wherein the pressure-sensitive interface mechanism detects when the user uses the stylus, finger or thumb based on detecting contact area with the touch screen display, and uses one of the fourth, fifth and sixth pressure maps that corresponds to the detected stylus, finger or thumb when the electronic device is in the landscape orientation.

9. An electronic device comprising:
   at least one processor;
   a memory coupled to the at least one processor;
   a touch screen display coupled to the at least one processor, the touch screen display comprising a pressure-sensitive interface that is capable of detecting a plurality of pressures when a user touches a displayed item on the touch screen display and interpreting each of the plurality of pressures as a different action with respect to the displayed item; and
   a pressure-sensitive interface mechanism residing in the memory and executed by the at least one processor, the pressure-sensitive interface mechanism performing a calibration of the touch screen display by:
   (a) prompting the user to put the electronic device in a portrait orientation;
   (b) dividing the touch screen display into the plurality of sections;
   (c) selecting one of the plurality of sections;
   (d) displaying a test icon in the selected one section;
   (e) prompting the user to apply a specified pressure level to the displayed test icon;
   (f) detecting and logging the pressure applied by the user to the displayed test icon;
   (g) repeating steps (c) through (f) for each of the plurality of pressure thresholds in each of the plurality of sections;
   (h) constructing a pressure map for the portrait orientation using the data detected and logged in step (f);
   (i) prompting the user to put the electronic device in a landscape orientation;
   (j) dividing the touch screen display into the plurality of sections;
   (k) selecting one of the plurality of sections;
   (l) displaying a test icon in the selected one section;
   (m) prompting the user to apply a specified pressure level to the displayed test icon;
   (n) detecting and logging the pressure applied by the user to the displayed test icon;
   (o) repeating steps (k) through (n) for each of the plurality of pressure thresholds in each of the plurality of sections; and
   (p) constructing a pressure map for the landscape orientation using the data detected and logged in step (n).

10. The electronic device of claim 9 further comprising:
    an orientation mechanism that determines physical orientation of the electronic device including when the electronic device is in the portrait orientation and when the electronic device is in the landscape orientation wherein the pressure-sensitive interface mechanism uses the pressure map for the portrait orientation when the electronic device is in the portrait orientation, and uses the pressure map for the landscape orientation when the electronic device is in the landscape orientation.

11. The electronic device of claim 9 wherein the pressure map for the first orientation comprises:
    for each of the plurality of sections, a plurality of pressure thresholds corresponding to a plurality of actions.

12. A method for a user to interact with an electronic device comprising:
    providing a touch screen display on the electronic device that comprises a pressure-sensitive interface that is capable of detecting a plurality of pressures when a user selects a displayed item on the touch screen display and interpreting each of the plurality of pressures as a different action with respect to the displayed item;
    providing a pressure map of the touch screen display that defines a plurality of pressure thresholds for each of a plurality of sections of the touch screen display, wherein a first pressure threshold for a first of the plurality of sections corresponds to a first action when the user touches the displayed item in the first section with a first pressure, and a second pressure threshold for the first section corresponds to a second action when the user touches the displayed item in the first section with a second pressure;
    calibrating the touch screen display by:
    (a) prompting the user to put the electronic device in a portrait orientation;
    (b) dividing the touch screen display into the plurality of sections;
    (c) selecting one of the plurality of sections;
    (d) displaying a test icon in the selected one section;
    (e) prompting the user to apply a specified pressure level to the displayed test icon;
    (f) detecting and logging the pressure applied by the user to the displayed test icon;
    (g) repeating steps (c) through (f) for each of the plurality of pressure thresholds in each of the plurality of sections;
    (h) constructing a pressure map for the portrait orientation using the data detected and logged in step (f);
    (i) prompting the user to put the electronic device in a landscape orientation;
    (j) dividing the touch screen display into the plurality of sections;
    (k) selecting one of the plurality of sections;
    (l) displaying a test icon in the selected one section;
    (m) prompting the user to apply a specified pressure level to the displayed test icon;

(n) detecting and logging the pressure applied by the user to the displayed test icon;
(o) repeating steps (k) through (n) for each of the plurality of pressure thresholds in each of the plurality of sections; and
(p) constructing a pressure map for the landscape orientation using the data detected and logged in step (n).

13. The method of claim 12 further comprising:
determining physical orientation of the electronic device including when the electronic device is in the portrait orientation and when the electronic device is in the landscape orientation;
using the pressure map for the portrait orientation when the electronic device is in the portrait orientation; and
using the pressure map for the landscape orientation when the electronic device is in the landscape orientation.

14. The method of claim 12 wherein the calibration of the touch screen display creates a plurality of pressure maps for the portrait orientation, wherein the plurality of pressure maps for the portrait orientation comprises:
a first pressure map that defines for the portrait orientation of the electronic device pressure thresholds for each of the plurality of sections when the user uses a stylus; and
a second pressure map that defines for the portrait orientation pressure thresholds for each of the plurality of sections when the user uses a finger.

15. The method of claim 14 wherein the plurality of pressure maps for the portrait orientation further comprises:
a third pressure map that defines for the portrait orientation pressure thresholds for each of the plurality of sections when the user uses a thumb.

16. The method of claim 15 further comprising detecting when the user uses the stylus, finger or thumb based on detecting contact area with the touch screen display, and using one of the first, second and third pressure maps that corresponds to the detected stylus, finger or thumb when the electronic device is in the portrait orientation.

17. The method of claim 12 further comprising a plurality of pressure maps for the landscape orientation, wherein the plurality of pressure maps for the landscape orientation comprises:
a fourth pressure map that defines for the landscape orientation of the electronic device pressure thresholds for each of the plurality of sections when the user uses a stylus; and
a fifth pressure map that defines for the landscape orientation pressure thresholds for each of the plurality of sections when the user uses a finger.

18. The method of claim 17 wherein the plurality of pressure maps for the landscape orientation further comprises:
a sixth pressure map that defines for the landscape orientation pressure thresholds for each of the plurality of sections when the user uses a thumb.

19. The method of claim 18 further comprising:
detecting when the user uses the stylus, finger or thumb based on detecting contact area with the touch screen display;
using one of the fourth, fifth and sixth pressure maps that corresponds to the detected stylus, finger or thumb when the electronic device is in the landscape orientation.

20. A method for a user to interact with an electronic device comprising:
providing a touch screen display on the electronic device that comprises a pressure-sensitive interface that is capable of detecting a plurality of pressures when a user selects a displayed item on the touch screen display and interpreting each of the plurality of pressures as a different action with respect to the displayed item; and
performing a calibration of the touch screen display by:
(a) prompting the user to put the electronic device in a portrait orientation;
(b) dividing the touch screen display into the plurality of sections;
(c) selecting one of the plurality of sections;
(d) displaying a test icon in the selected one section;
(e) prompting the user to apply a specified pressure level to the displayed test icon;
(f) detecting and logging the pressure applied by the user to the displayed test icon;
(g) repeating steps (c) through (f) for each of the plurality of pressure thresholds in each of the plurality of sections; and
(h) constructing a pressure map for the portrait orientation using the data detected and logged in step (f);
(i) prompting the user to put the electronic device in a landscape orientation;
(j) dividing the touch screen display into the plurality of sections;
(k) selecting one of the plurality of sections;
(l) displaying a test icon in the selected one section;
(m) prompting the user to apply a specified pressure level to the displayed test icon;
(n) detecting and logging the pressure applied by the user to the displayed test icon;
(o) repeating steps (k) through (n) for each of the plurality of pressure thresholds in each of the plurality of sections; and
(p) constructing a pressure map for the landscape orientation using the data detected and logged in step (n).

21. The method of claim 20 further comprising:
determining physical orientation of the electronic device including when the electronic device is in the portrait orientation and when the electronic device is in the landscape orientation;
using the pressure map for the portrait orientation when the electronic device is in the portrait orientation; and
using the pressure map for the landscape orientation when the electronic device is in the landscape orientation.

22. The method of claim 20 wherein the pressure map for the first orientation comprises:
for each of the plurality of sections, a plurality of pressure thresholds corresponding to a plurality of actions.

* * * * *